United States Patent
Koebernik et al.

[11] Patent Number: 5,224,379
[45] Date of Patent: Jul. 6, 1993

[54] FLOAT ACTIVATED GAUGE

[75] Inventors: Ronald E. Koebernik, Cedarburg; Michael J. Holz, West Bend, both of Wis.

[73] Assignee: The Kelch Corporation, Cedarburg, Wis.

[21] Appl. No.: 960,652

[22] Filed: Oct. 14, 1992

[51] Int. Cl.⁵ ............... G01K 5/62; G05D 23/08
[52] U.S. Cl. ................... 73/308; 200/84 C; 340/624
[58] Field of Search .......... 73/308, 322, DIG. 5; 340/624; 200/84 C

[56] References Cited

U.S. PATENT DOCUMENTS

| | | | |
|---|---|---|---|
| 3,270,158 | 8/1966 | Puster | 200/84 C |
| 3,504,316 | 3/1970 | Bekedam | 200/84 C X |
| 3,751,614 | 8/1973 | Jones | 200/84 C |
| 3,759,286 | 9/1973 | Page | 137/392 |
| 4,441,860 | 4/1984 | Tsujimoto | 200/84 C X |
| 4,879,902 | 11/1989 | Loniello | 73/304 R |
| 4,924,703 | 5/1990 | White et al. | 340/624 X |
| 5,035,512 | 7/1991 | Tateishi et al. | 73/308 X |

*Primary Examiner*—Daniel M. Yasich
*Attorney, Agent, or Firm*—Quarles & Brady

[57] ABSTRACT

A gauge for indicating whether the level of a liquid, such as fuel or oil, in a tank has reached one or more preselected levels. A magnet is mounted in a stem attached atop a float which moves up and down with the rising and falling of the liquid level. When the magnet is adjacent an electrical switch housed in a sealed cover, the switch closes and connects an external power supply to a warning light. The float moves within a cylinder which has a small drain hole at the bottom and a vent near the top. Liquid moves into and out of the guide through the drain hole at a relatively slow rate and thereby eliminates intermittent closing and opening of the switch which would otherwise occur due to the sloshing of the liquid when the tank is in motion, such as when mounted in a vehicle.

5 Claims, 2 Drawing Sheets

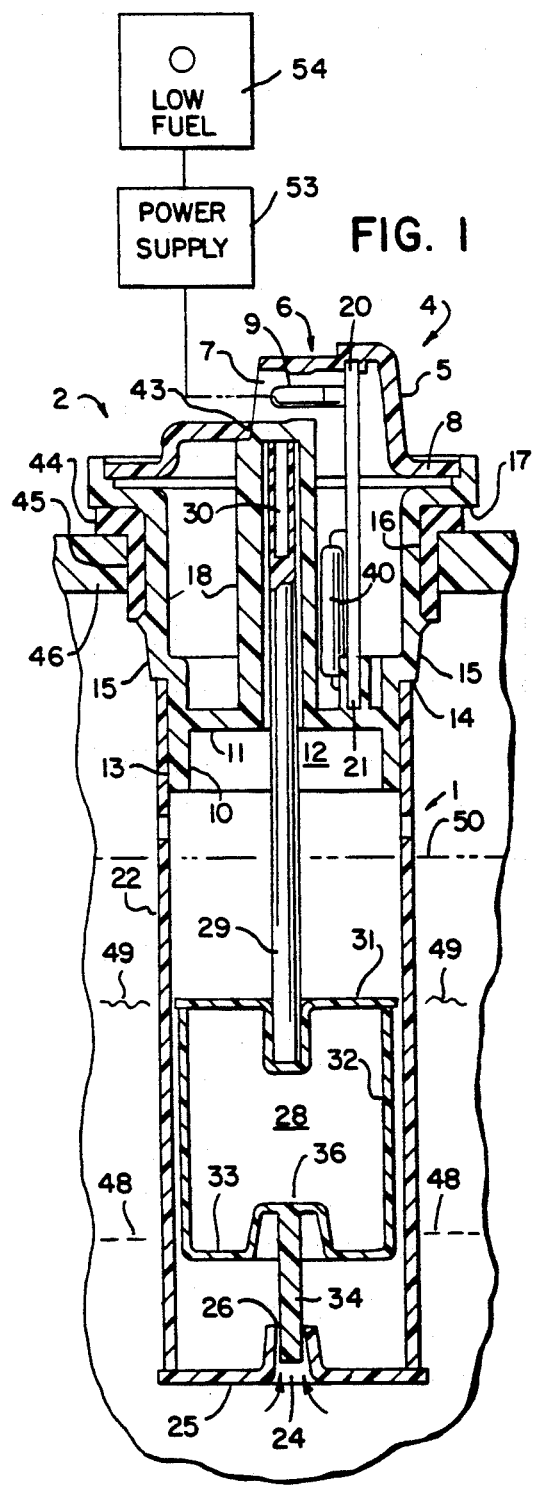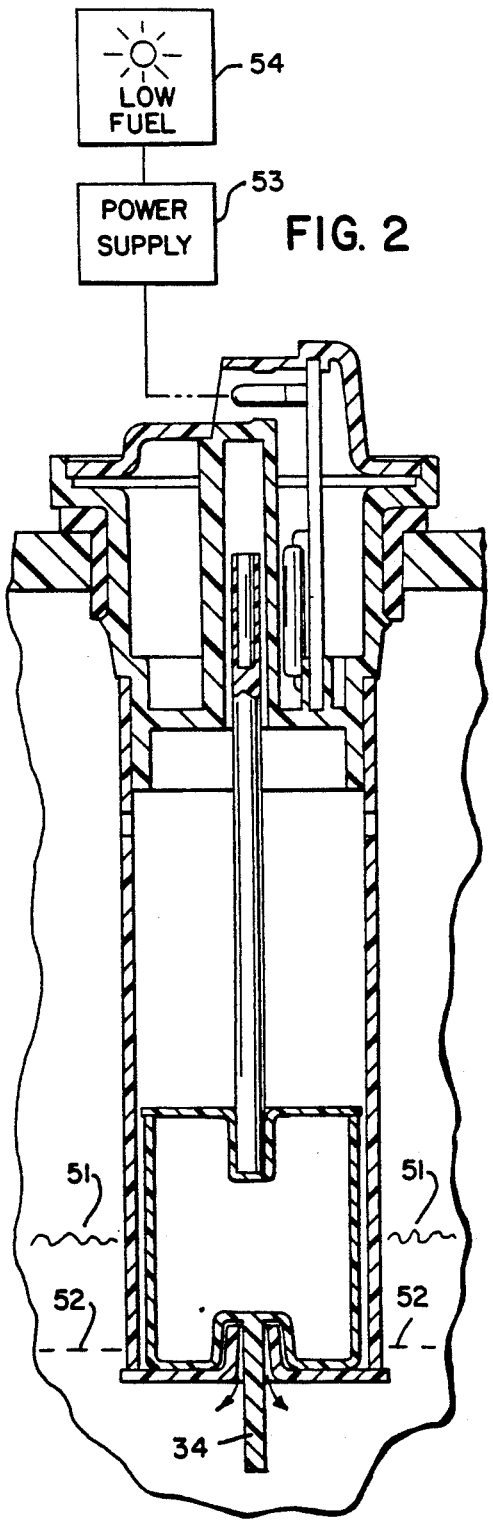

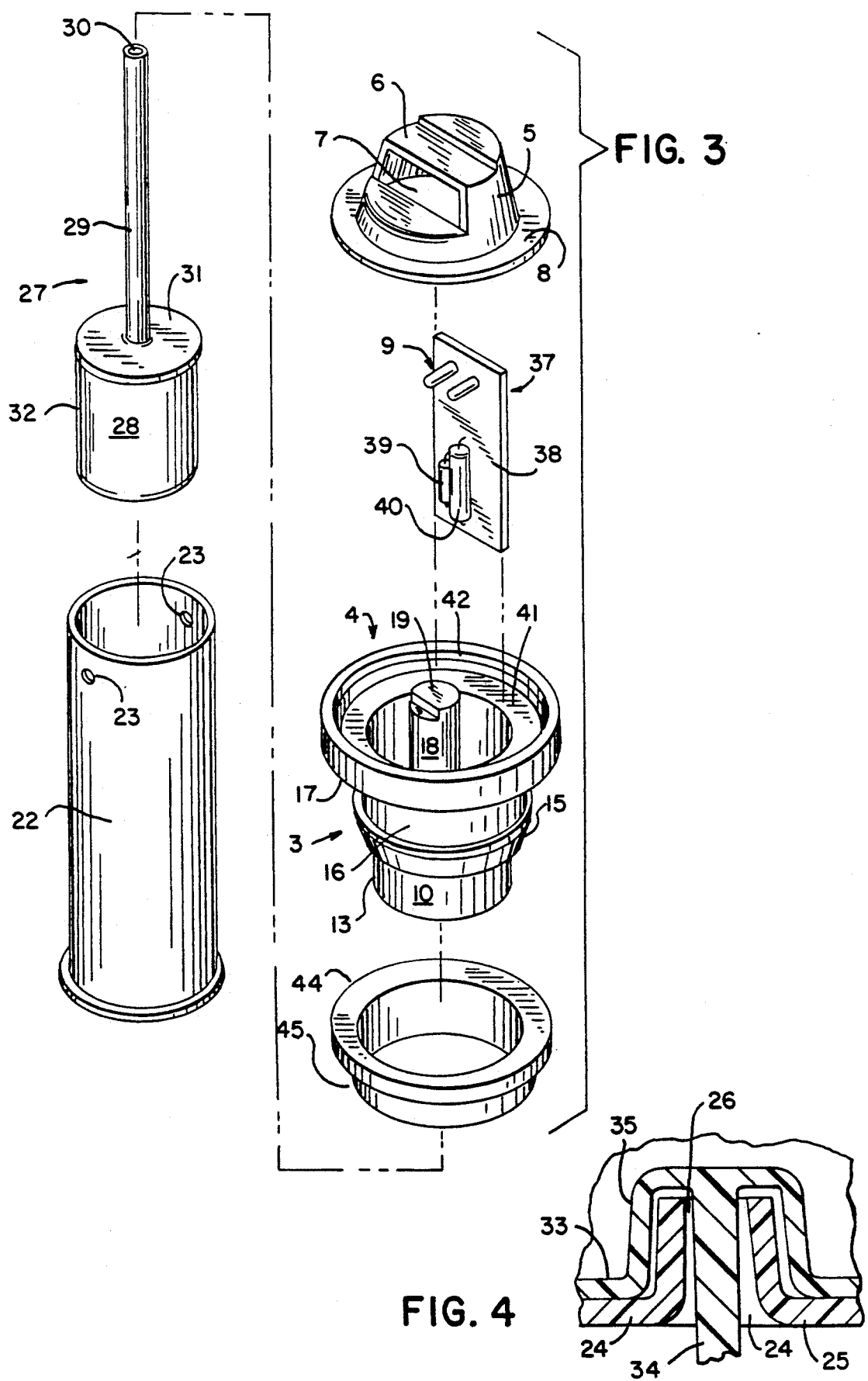

FLOAT ACTIVATED GAUGE

BACKGROUND OF THE INVENTION

1. Field of the Invention

This invention relates to gauges which report information on the level of a liquid in a tank.

2. Description of the Art

One type of prior art liquid level gauge employs a float mounted magnet that passes by a reed switch and thereby makes or breaks an electrical circuit connected to a warning light. This switch is positioned in the tank at the warning level or below the tank bottom wall, and the magnet is mounted in the float itself approximately at the surface of the liquid. When the float and therefore the magnet descend to the warning level, the magnet is positioned adjacent the switch and closes it. The switch is connected to an external light and power supply by wires extending into or under the tank from outside. This need to run wires into (or around and under) the tank necessitates a different length of wiring for each tank size and creates the need to prevent leaks around the wiring (when the wiring is in the tank). It also increases the cost of manufacture and assembly.

In addition, these prior art gauges are prone to providing a flickering warning light as a result of the surface motion of the liquid in a tank which can be mounted in a moving vehicle (e.g., a garden tractor, a snowmobile, or a boat).

SUMMARY OF THE INVENTION

The invention provides improvements in a liquid-level gauge of the type in which a float mounted magnet moves adjacent to and thereby closes an electrical switch when the liquid level reaches one or more warning levels. The gauge comprises a cover suitable to cover a hole in an upper wall of the tank and a guide connected to the cover and extending into the tank. A float with a stem is mounted under the cover so as to be able to rise and fall with the level of the liquid in the tank, and its movement is contained by the guide. A magnet is mounted within the stem and moves with it. One improvement provided by the present invention is that the switch is mounted in the cover, rather than being located at a warning level in the tank or under the tank. Though the magnet, which is mounted to a stem which extends upward from the float, moves adjacent to the switch, the cover-mounted switch may be sealed off from the tank.

In a preferred aspect of the invention, the guide is an enclosed tube within which the float moves up and down as liquid drains in and out of the tube through a drain hole. Enclosing the float in a tube is an improvement over the prior art because the level of the liquid in the tube is insulated from any surface sloshing as a result of tank movement, and therefore a flickering of the warning light is avoided.

It will be appreciated that the invention provides improvements in float actuated gauges. Locating the switch in the cover rather than in the tank permits manufacture of a cover assembly which can be standard for tanks of differing depths. Only the length of the float guide (e.g., the tube of the preferred embodiment) and the length of the stem for mounting the magnet to the float will vary depending on the depth of the warning level. This permits more efficient and less costly manufacture and avoids having electric wiring extend into the tank. In addition, housing the float in a tube into which and out of which the liquid flows slowly isolates the float from surface motion of the liquid and thereby prevents intermittent signals.

The objects of the invention therefore include reducing the cost of manufacture and preventing liquid surface motion from causing an intermittent warning.

These and other objects and advantages of the invention will be apparent from the description which follows. The preferred embodiment will be described with reference to the accompanying drawings. This embodiment does not represent the full scope of the invention. Rather the invention may be employed in other embodiments. Reference should therefore be made to the claims herein for interpreting the breadth of the invention.

BRIEF DESCRIPTION OF THE DRAWINGS

FIG. 1 is a cross-sectional side elevation view of a float actuated gauge embodying the present invention, showing the position of the float and magnet when the liquid level is above the warning level;

FIG. 2 is the same as FIG. 1 except that the level of the liquid has dropped below the warning level;

FIG. 3 is an exploded perspective view of the gauge of FIGS. 1 and 2; and

FIG. 4 is an enlarged cross-sectional view of the bottom portion of FIG. 2.

DESCRIPTION OF THE PREFERRED EMBODIMENT

The embodiment depicted in the drawings is a low-level indicator. It will be recognized that with minor modifications, the invention can be employed as a high-level indicator or as a multi-level indicator.

FIGS. 1 and 2 show in cross section a float actuated gauge 1 embodying the present invention. Cover 2 includes cap top 3 and cap housing 4 (both seen in perspective in FIG. 3). Cap 3 has a pill-box like shape defined by wall 5, stepped top 6, port 7 and flange 8. Port 7 provides access for an electrical cord to plug 9.

Housing 4 has a lower portion consists of fitting ring 10 which, with overhang 11 (seen in FIGS. 1 and 2), defines opening 12. The outer surface of fitting ring 10 constitutes fitting surface 13. The upper end of fitting surface 13 ends with abutment 14, which is the bottom of wall 15, which in turn extends upwardly and becomes grommet mounting surface 16, which extends upwardly until it meets grommet abutment 17.

The upper interior of housing 4 is a cylindrical chamber which is sealed at the bottom and which has a hollow central post 18. Post 18 is sealed at the top 19. The interior of fitting ring 10, overhang 11 and the interior of post 18 seal off housing 4 from the remainder of the gauge and from the liquid in the tank.

Float guide 22 in FIG. 4 is a hollow tube which is open at the top, has vent holes 23 near the top and has a volcano-shaped drain hole 24 in its bottom 25. See FIGS. 1 and 3. Hole 24 defines passageway 26.

Float assembly 27 consists of float body 28, stem 29 and magnet 30. Float body 28 is a cylinder having an indented top 31, cylindrical side wall 32 and tail 34 on the bottom wall 33. The cylindrical indentation of bottom 33 consists of cylindrical wall 35 and raised floor 36.

As best seen in FIG. 3, circuit assembly 37 consists of plug 9, resistor 39 and reed switch 40 mounted on a board 38. One prong of plug 9, resistor 39, switch 40 and the other prong of plug 9 are electrically connected (not shown) in series.

Cap 3, housing 4 and float guide 22 may advantageously be manufactured of nylon by an injection molding process. Float body 28 may be a hollow structure of acetal resin or a block of foamed nylon. Float stem 29 can be selectively made of solid or hollow nylon tubing. Magnet 30 may be a standard, readily available Alnico magnet. It is friction fitted into a bore at the end of stem 29. Reed switch 40 is magnetically operated and hermetically sealed. Resistor 39 is chosen for compatibility with the power supply, and the exterior warning light. Circuit board of 38 in FIG. 3 is made of conventional circuit board material.

As best seen in FIG. 1, in assembling the gauge, the top and bottom sides of circuit board 38 are friction fitted into slots 20 and 21 of cap 3 and housing 4 respectively, and flange 8 is nested into the seating area of housing 4, which consists of floor 41 and wall 42. Flange 8 is welded to the seating area; the junction 43 of cap 3 and post top 19 is also welded. The result is a unit which contains the switch and wiring and which can be used on tanks of varying depths.

Stem 29 and float guide 22 are manufactured in varying lengths to accommodate tanks of different depths. For each installation, their lengths are chosen such that, when float body 28 is at the warning level, the float will rest on the bottom 25 of float guide 22, and magnet 30 will be adjacent to reed switch 40. Stem 29 is fastened to flow guide 28, such as by a friction fit in an indentation in top 31 of float guide 28, threading or other fastening means. Float assembly 27 is inserted into float guide 22. The guide is welded to housing 4. Stem 29 then extends into the interior of post 18 of housing 4.

Rubber grommet 44 is slipped onto grommet mounting surface 16. It has a circumferential indentation 45 which is sized to accommodate the thickness of the top 46 of the tank into which the gauge is to be installed.

The unit so assembled is inserted into a hole in tank top 46 (shown in FIG. 1). It is held firmly in place by the resiliency of grommet 44 against tank top 46. In the alternative, a threaded connection could be used.

FIGS. 1 and 2 illustrate the operation of the gauge. In FIG. 1, the level of the liquid 49 is above the warning level 48. Float 28 is thereby urged upward until the end of stem 29 meets post top 19. At that point, magnet 30 is above, rather than adjacent to, reed switch 40, which allows reed switch 40 to remain open (as it is biased to the open position). If the level were instead higher (e.g., level 50), the float position would be the same.

In FIG. 2, the liquid level 51 has dropped to the warning level 48. Some of the liquid previously in float guide 22 has dropped through passageway 26 so that the liquid in the guide 22 is at the same level as the liquid in the tank. At this point, float body 28 is resting on bottom 25 (which serves as a stop for a descending float) float guide 22, which brings magnet 30 adjacent to reed switch 40, causing the switch to close. This completes an electrical circuit which enables the external power supply 53 to warning light 54 and thereby indicate that the liquid is at the warning level 48. It will be recognized that if the liquid continues to drop (e.g., to level 52), float 28 will continue to rest on bottom 25 of float guide 22, leaving magnet 30 adjacent reed switch 40. Thus, warning light 54 will continue to be lit as long as the liquid level is at or below warning level 48. (If the invention were employed as a high-level indicator, magnet 30 would be mounted lower in stem 29 so that it would be below reed switch 40 at liquid levels below the selected high warning level, and, with the liquid level at or above the high warning level, stem 29 would be stopped by post-top 19 (which would serve as an ascending float stop) so that magnet 30 would be adjacent to reed switch 40.)

Short-term agitation of the surface of the liquid in the tank has little if any effect on the level of the liquid in float guide 22. Accordingly, float body 28 is insulated from that agitation, avoiding intermittent flickering signals.

Although the especially preferred embodiment of the invention has been described above, the invention claimed is not so restricted. There may be various other modifications and changes to this embodiment which is within the scope of the invention. For example, the magnet and stem could be arranged so that the magnet is below the reed switch until the liquid level has risen beyond a specified high warning level. This could, for example, provide an overflow warning or an overflow preventing signal. In addition, more than one reed switch could be employed so that the device would indicate the current level of liquid in the tank rather than that a high or low warning level had been reached. Also, the power source and indicator could both be in the cap (e.g., a small battery or solar cell and a read out panel). It will be recognized as well that other materials and other methods of manufacture and assembly may be employed to carry out the present invention. Thus, the invention is not to be limited by the specific description above, but should be judged by the claims which follow.

We claim:

1. A float activated gauge for measuring the level of a liquid in a tank, comprising:

a cover suitable to cover a hole in an upper tank wall;

a float mounted under the cover so as to be able to extend into the tank so as to be able to rise and fall with the level of the liquid in the tank;

a guide connected to the cover and insertable into the tank so that if circumscribes the float and restricts movement of the float while permitting limited vertical movement of the float in response to tank liquid level changes;

a magnet mounted to the float to move therewith;

a magnetically-activated electrical switch mounted to the cover adjacent the path of the magnet, whereby the magnet will activate the switch when the magnet is at a selected position relative to the switch; and a drain hole in a lower portion of the guide sized so that changes in the liquid level in the guide will lag changes in the tank liquid level, so as to thereby inhibit signal chattering in response to transient tank level changes.

2. The gauge of claim 1, wherein there is a stop on the guide which stops the descent of the float, thereby holding the magnet immediately adjacent the switch when the liquid level is below the selected level.

3. The gauge of claim 1, wherein there is a stop which stops the ascent of the float, thereby holding the magnet immediately adjacent the switch when the liquid level is above the selected level.

4. The gauge of claim 1, wherein a stem is mounted on the top of the float and the magnet is affixed to an upper end of the stem.

5. The gauge of claim 4, wherein the float has a vertical tail extending downward into the drain hole, and the cover has a vertical passageway into which the stem extends, whereby the drain hole and the vertical passageway form a track.

* * * * *

UNITED STATES PATENT AND TRADEMARK OFFICE
CERTIFICATE OF CORRECTION

PATENT NO. : 5,224,379

DATED : July 6, 1993

INVENTOR(S) : Ronald E. Koebernik and Michael J. Holz

It is certified that error appears in the above-identified patent and that said Letters Patent is hereby corrected as shown below:

In column 3, line 13 of the patent, "Circuit board of 38" should be --Circuit board 38--.

In column 4, line 38, "if" should be --it--.

Signed and Sealed this

Fifteenth Day of February, 1994

Attest:

BRUCE LEHMAN

*Attesting Officer*  Commissioner of Patents and Trademarks